Figure 1:
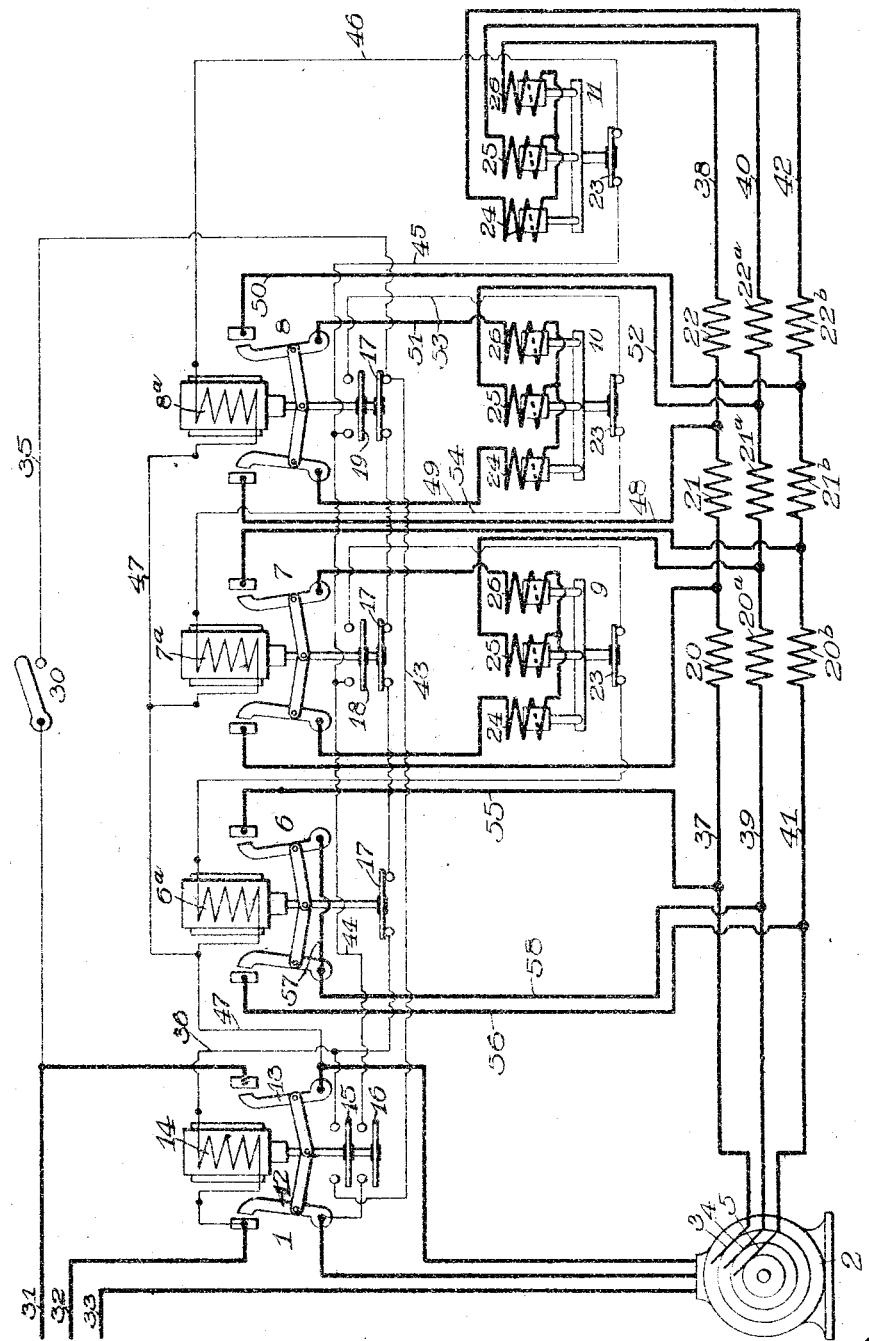

A. SIMON.
CONTROLLER FOR ALTERNATING CURRENT MOTORS.
APPLICATION FILED JUNE 1, 1909.

1,132,741.

Patented Mar. 23, 1915.
2 SHEETS—SHEET 2.

Witnesses:
George E. Haynes
S. W. Fitzfield

Inventor:
Arthur Simon.
By Edwin B. H. Tower, Jr.
Atty.

UNITED STATES PATENT OFFICE.

ARTHUR SIMON, OF MILWAUKEE, WISCONSIN, ASSIGNOR TO THE CUTLER-HAMMER MFG. CO., OF MILWAUKEE, WISCONSIN, A CORPORATION OF WISCONSIN.

CONTROLLER FOR ALTERNATING-CURRENT MOTORS.

1,132,741.  Specification of Letters Patent.  Patented Mar. 23, 1915.

Application filed June 1, 1909. Serial No. 499,545.

*To all whom it may concern:*

Be it known that I, ARTHUR SIMON, a citizen of the United States, residing at Milwaukee, in the county of Milwaukee and State of Wisconsin, have invented new and useful Improvements in Controllers for Alternating-Current Motors, of which the following is a full, clear, concise, and exact description, reference being had to the accompanying drawing, forming a part of this specification.

My invention relates to improvements in controllers for alternating current motors and more particularly to controllers for induction motors. In the control of such motors, resistances or other current reducing means are commonly inserted in each phase of the secondary circuit thereof for protecting the motor in starting. The resistances, or other current reducing means, are then removed from circuit either by manual or automatic means to bring the motor up to normal speed. With such controllers it frequently occurs that the acceleration of the motor is so retarded under a heavy load as to cause abnormal conditions in the secondary circuit if the resistances, or other current reducing means, are removed from circuit in the ordinary course. In other words, if the resistances, or other current reducing means, are disconnected from circuit within a predetermined time, or at predetermined intervals, regardless of the load on the motor, it may happen that the load is so great as to retard the acceleration of the motor, thereby causing excessive surges of current through the windings thereof.

It is, therefore, the object of my invention to provide protecting means for preventing the occurrence of such abnormal conditions, regardless of the load on the motor.

A further object of my invention is to render the protecting means responsive to abnormal conditions in the secondary circuit instead of those in the primary circuit, inasmuch as the variations in the electrical conditions in the motor occur first in the secondary circuit.

A further object of my invention is to provide a controller having the characteristics above mentioned which will be particularly applicable to motors having polyphase secondary circuits.

Various other objects and advantages of my invention will be hereinafter fully and clearly set forth.

In order to more clearly disclose the nature of my invention, I shall describe the embodiments thereof illustrated in the accompanying drawings.

Of course, my invention is susceptible of various modifications.

Figure 2:
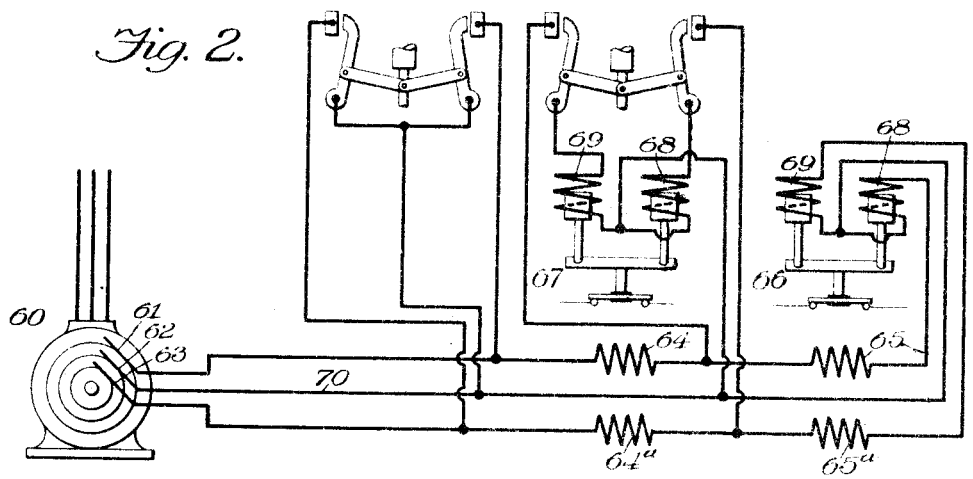
Figure 3:
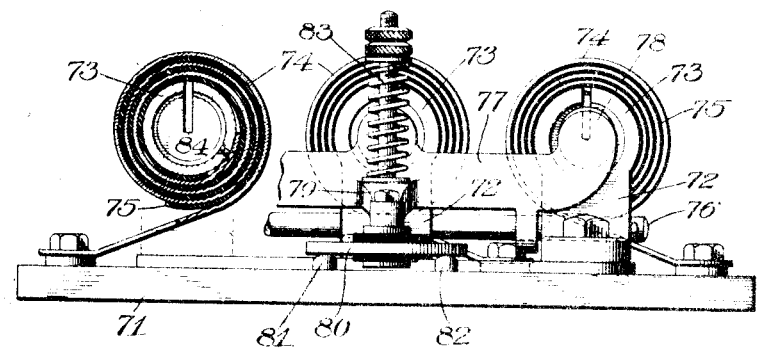
Figure 4:
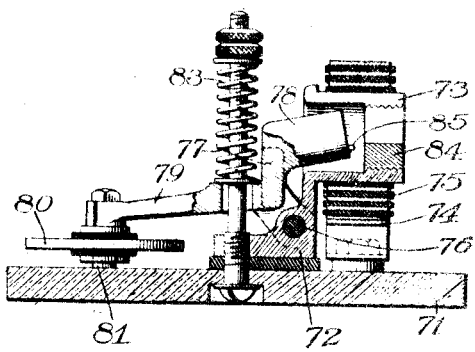

In the drawing, Figure 1 diagrammatically illustrates one embodiment of my invention as applied to a motor having a three phase secondary circuit; Fig. 2 illustrates diagrammatically one embodiment of my invention as applied to a motor having a two phase secondary circuit; and Figs. 3 and 4 illustrate one form of relay device which I have worked out in practice.

The controller diagrammatically illustrated in Fig. 1 includes a main switch 1 for controlling the primary circuit of the motor 2. As illustrated, the motor is provided with a three phase primary circuit, and with slip rings 3, 4 and 5, each of which is connected in a separate phase of the secondary circuit. It should be understood, however, that my invention is applicable to various other forms of motors than that illustrated. The controller also includes accelerating switches 6, 7 and 8 and protecting devices or relays 9, 10 and 11. In practice, I prefer to provide a separate relay device for each of the accelerating switches. As will be hereinafter set forth, the relay devices 9, 10 and 11 control the accelerating switches 6, 7 and 8 respectively. In practice, the main switch and the accelerating switches may be of any preferred type, but, for the purpose of illustration, I have shown all of the switches of the same general construction. The main switch 1 comprises a pair of contact members 12 and 13 suitably connected to the plunger of an actuating winding 14. Each of the members 12 and 13 is connected in a different phase of the primary circuit. The core of the operating winding 14 of the main switch is preferably provided with a tail rod carrying contact disks 15 and 16, each adapted to engage a pair of stationary contacts when the main switch 1 is closed. The purpose of these contact disks will be hereinafter set forth. The accelerating switches 6, 7 and 8 are provided with operating windings $6^x$, $7^x$ and $8^x$ respectively. The plungers of the windings $6^a$, $7^a$ and $8^a$ each carry a contact disk 17, adapted to engage a pair of stationary contacts when its respective accelerating switch is opened. The plungers of the windings 7ª and 8ª also carry contact disks 18 and 19 respectively, each adapted to engage a pair of stationary contacts when its respective accelerating switch is closed. The switches 6, 7 and 8 are arranged to control sets of resistance sections, or other current reducing means, 20, 21 and 22 respectively. Each set of resistances includes three sections, one section arranged in each phase of the secondary circuit of the motor.

As illustrated, each of the protecting devices or relays comprises a switch 23 having a plurality of actuating windings 24, 25 and 26. The purpose of providing a plurality of windings for each relay device is as follows: In induction motors of the type disclosed, the frequency of the secondary circuit decreases as the speed of the motor increases. Hence, when the motor attains a high speed, the frequency of the secondary circuit is very low. It is, therefore, obvious that if a single winding was relied upon to actuate each relay device, the relay devices might respond and almost immediately return to normal position before normal conditions were restored in the motor. As will be hereinafter set forth, each of the accelerating switches is adapted to respond immediately upon the return of its corresponding relay to normal position and at the same time render its corresponding relay thereafter inoperative. Thus, if the relay devices returned to normal position before normal conditions were restored in the motor, they would fail to perform the function for which they are provided; that is, to check the operation of their corresponding accelerating switches as long as abnormal conditions exist in the motor. On the other hand, I have found that by providing a plurality of coils for each relay and connecting said coils in different phases of the secondary circuit, that when the relays once respond, they will not return to normal position until normal conditions are restored, and this notwithstanding the fact that the frequency in the secondary circuit may be very low. In the drawings, I have shown each relay provided with as many coils as there are phases in the secondary circuit; but, of course, this would not be necessary where the motor had a multiplicity of phases in the secondary circuit. The number of coils need only be sufficient to insure a substantially constant resultant or combined pull.

It should, of course be understood that relay devices may be of various different constructions and that my present invention is not limited to the particular form of relay device illustrated. It should also be understood that various arrangements may be employed in practice for adjusting the relays to respond under different predetermined conditions. In fact, the relays might be adjusted in any of the well known ways for adjusting direct current relays.

The circuit connections for the controller will be fully and clearly set forth in the following description of the operation thereof.

The operating windings of the several switches are initially controlled by a manually operated switch 30 connected to one of the main lines. Of course, in practice, the switch 30 may be of any preferred type. Current is supplied to the primary winding, or windings, of the motor from a three phase alternating circuit, having three supply lines 31, 32 and 33. To initially start the motor, the switch 30 should first be closed. Assuming that all of the switches are in the position illustrated, closure of the switch 30 would complete a circuit from main line 31 by conductor 35, through the auxiliary contacts 17 of all of the accelerating switches, by conductor 36 through the operating winding 14 of the main switch 1 to main line 32. The winding 14 being thus connected across one phase of the primary circuit, becomes energized and closes the main switch. Closure of the main switch 1 connects main line 31 to one terminal of the motor, and main line 32 to another terminal thereof. Main line 33 is shown as permanently connected to a third terminal of the motor. Closure of the switch 1 thus completes the primary circuit of the motor. Current then flows in the secondary circuit of the motor. One phase of the secondary circuit passes from the brush of slip ring 3 by conductor 37, through resistances 20, 21 and 22 by conductor 38, through the winding 26 of relay 11. A second phase passes from the brush of slip ring 4 by conductor 39, through the resistances 20ª, 21ª and 22ª by conductor 40, through winding 25 of relay 11. The third phase extends from slip ring 5 by conductor 41, through resistances 20ᵇ, 21ᵇ and 22ᵇ, by conductor 42, through the winding 24 of relay 11. The lower terminals of all of the windings of relay 11 are electrically connected, and hence, each phase of the secondary circuit extends through one of said windings to a common point. It will thus be seen that the windings of the relay device 11 are, in effect, "star" connected to the secondary circuit of the motor. This obviates the necessity of insulating the windings of the relay from one another and consequently simplifies the construction of the relay. Of course, the windings of the relay might be connected differently if preferred. Returning, now, to the effect of the closure of the main switch, it will be seen that when the same is operated, it closes the auxiliary switches 15 and 16. Closure of the auxiliary switch 15 completes a maintaining circuit for the winding of the main switch which may be traced from conductor 35 by conductor 43, through switch 15 to conductor 36, and thence through the winding 14. This circuit parallels the auxiliary switches 17 of the accelerating switches and, consequently, renders the same ineffective to open the circuit of the winding 14. On the other hand, the circuit of the winding 14 cannot be initially closed unless all of the accelerating switches are open and the switches 17 closed. Closure of the auxiliary switch 16 of the main switch 1 completes a circuit from main line 32 by conductors 44 and 45, through the switch 23 of relay device 11, by conductor 46, through the winding $8^a$ of accelerating switch 8, by conductor 47, through the member 13 of switch 1 to main line 31. The winding $8^a$ is thus connected across one phase of the primary circuit and would become energized to close the switch 8, assuming that the relay device 11 did not respond. However, the main switch is arranged to close slightly in advance of the auxiliary switch 16, and thus allow sufficient time for the relay device 11 to respond to the initial inrush of current in the secondary circuit before the circuit of the winding $8^a$ is completed. The relay device, if it responded, would thus open its switch 23, thereby preventing closure of the circuit of the winding $8^a$ by the auxiliary switch 16. The provision of a plurality of windings for the relay, one connected in each phase of the secondary circuit, insures the retention of the relay switch in open position until normal conditions are restored in the secondary circuit. Thus upon the restoration of normal conditions in the secondary circuit, the relay device 11 would drop its switch 23, thereby closing the circuit of the winding $8^a$. The winding $8^a$ would then become energized and close the switch 8. Closure of the switch 8 short circuits the resistances 22, $22^a$ and $22^b$ from the secondary circuit and at the same time short circuits the operating windings of the relay device 11. This renders the relay device ineffective to again operate to open the switch 8. Upon closure of the switch 8, one phase of the secondary circuit, after passing through resistance 21, passes by conductor 48, through one side of switch 8, by conductor 49, through the winding 24 of relay device 10. Another phase, after passing through resistance $21^b$, passes by conductor 50, through the other side of switch 8, by conductor 51, through the winding 26 of relay 10. The third phase passes from resistance $21^a$ by conductor 52, through the winding 25 of relay 10. Thus closure of the switch 8 not only short circuits the resistances 22 and the relay 11, but also connects the windings of the relay 10 in circuit. One winding of the relay 10 is permanently connected in one phase of the secondary circuit so that the windings thereof are, in effect, connected exactly like the windings of the relay 11. If upon closure of the switch 8 there is an excessive flow of current in the secondary circuit, then the relay device 10 would respond to prevent closure of the accelerating switch 7. On the other hand, if the relay device 10 did not respond, then, upon closure of the switch 8, the auxiliary switch 19, operated thereby, would complete the circuit of the winding $7^a$. This circuit would extend to conductor 44 as already traced, thence through auxiliary switch 19 by conductor 53, through switch 23 of relay 10, by conductor 54, through the winding $7^a$ to conductor 47. The winding $7^a$ would then become energized and close the switch 7. Closure of the switch 7 would short circuit the resistances 21, $21^a$ and $21^b$ in the secondary circuit, and also short circuit the windings of the relay device 10. At the same time, it would connect the winding of the relay device 9 in circuit in the same manner as switch 8 connects the relay 10 in circuit. Furthermore, closure of the switch 7 would cause its auxiliary switch 18 to close, thereby completing the circuit of the winding $6^a$ as soon as the relay 9 returned to initial position, if the same responded to an excessive flow of current in the secondary circuit. Closure of the switch 6 would short circuit the remaining resistances 20, $20^a$ and $20^b$ from the secondary circuit. One phase of the secondary circuit would then pass from slip ring 3 by conductor 55, through one arm of the switch 6. Another phase would pass from slip ring 5 by conductor 56 through the other arm of switch 6. The arms of switch 6 are electrically connected by conductor 57 which, in turn, is connected by conductor 58 to slip ring 4.

In Fig. 2 I have omitted many of the features shown in Fig. 1, but I have shown enough of the controller to clearly illustrate the manner in which the same may be applied to a motor having a two phase secondary circuit. As a matter of fact, the relay devices are the only elements of the controller shown in Fig. 1 which would have to be modified for application to a motor having a two phase secondary circuit. The motor 60, illustrated in this figure, may be assumed to have either a three phase or three wire two phase primary circuit. The motor 60 is provided with slip rings 61, 62 and 63. The slip rings are connected to three wires constituting a two phase secondary circuit. Resistances 64 and 65 are connected in one phase of the secondary circuit, while resistances $64^a$ and $65^a$ are connected in the other phase thereof. The relay devices 66 and 67 are in this instance only provided with two operating windings 68 and 69, one for each phase of the secondary circuit. The windings of the relay 66 are preferably so connected that one phase of the secondary circuit will pass from slip ring 61 through resistances 64 and 65 and thence through the winding 68 of said relay, by conductor 70, back to slip ring 62. The other phase will pass from slip ring 63 through the resistances 64ª and 65ª and thence through the winding 69 of relay 66 to conductor 70. It will thus be seen that the windings of the relay 66 are connected in the secondary circuit in substantially the same manner as the relays shown in Fig. 1. Upon closure of the first accelerating switch, the winding of the relay 67 will be connected in the secondary circuit in the same manner as the winding of the relay 68.

I shall now describe the device illustrated in Figs. 3 and 4. Although this device is provided with three windings, it should be understood that a two winding relay might be constructed in the same manner. As illustrated, the several parts of the device are mounted on a suitable insulating base 71. Rigidly mounted on the base 71 is a frame 72 preferably formed of conducting material and provided with a plurality of hollow cylindrical portions 73. Supported by the frame 72 are a plurality of electromagnetic windings 74, the number of which may be varied as desired. Each of the windings as illustrated comprises a flat strip of conducting material wound spirally about one of the cylindrical portions of the frame. The inner end of each strip is electrically connected to the supporting frame, while the convolutions thereof are separated by suitable strips of insulating material 75. It should be understood, however, that the windings might be formed of wire if preferred, and that said windings need not necessarily be electrically connected to the supporting frame. Fulcrumed on a pin or rod 76 supported by the frame 72 is an elongated member 77, having a plurality of cylindrical projections 78 arranged to extend into the hollow cylindrical portions of the frame. The member 77 thus forms a common armature for all of the electromagnets 74. The member 77 is also provided with an arm 79 which carries a contact disk 80 adapted to engage and bridge a pair of stationary contacts 81 and 82. The member 79 is preferably normally held by a suitable tension device 83 in such a position that the contact disk carried thereby will engage its stationary contacts. In practice, I prefer to form the frame of brass and the member 77 of iron. I also prefer to insert in the end of each of the cylindrical portions of the frame an iron plug 84 which acts as a stop for the portions 78 of the member 77. To prevent the portions 78 of the frame from sealing with the iron plugs 84, I prefer to provide the former with small projections 85. When the windings become energized, they exert a pull on the member 77, thereby turning the same upon its pivot against the action of the tension device to withdraw the contact disk 80 from its stationary contacts. With this arrangement, it will be seen that the tension device may be adjusted to vary the conditions under which the contact disk is withdrawn from the stationary contacts.

In the device illustrated, it will be seen that slots are provided in the cylindrical portions of the frame and also in the iron plugs. The purpose of these slots is to obviate, so far as possible, the production of eddy currents.

Having thus described my invention, what I claim as new and desire to secure by Letters Patent, is:—

1. In a controller for alternating current motors, in combination, electro-responsive means for accelerating the motor in steps and electro-responsive circuit controlling means therefor necessitating normal electrical conditions in all phases of the secondary circuit prior to each step of acceleration.

2. In a controller for alternating current motors, in combination, electro-responsive means for accelerating the motor in steps and electro-responsive circuit controlling means therefor responsive to abnormal current conditions in any phase of the secondary circuit of the motor to prolong the intervals between the steps of acceleration.

3. In a controller for alternating current motors, in combination, accelerating means, and a relay device having a plurality of windings connected in different phases of the secondary circuit of the motor, said device being adapted to respond upon an excessive flow of current through the motor to check the operation of said means.

4. In a controller for alternating current motors, in combination, accelerating means, and a relay device having a plurality of operating windings, one connected in each phase of the secondary circuit of the motor, said device being adapted to respond upon an excessive flow of current through the motor to check the operation of said means.

5. In a controller for alternating current motors, in combination, accelerating means, and a relay device adapted to check the operation of said means upon the occurrence of abnormal conditions in the motor circuit, said relay device having a plurality of actuating windings connected in different phases of the secondary circuit of the motor, each of said windings having one terminal thereof connected to one terminal of each of the others of said windings.

6. In a controller for alternating current motors, in combination, a plurality of electroresponsive accelerating switches, and a plurality of relays, each adapted to control the circuit of the operating winding of one of said switches to prevent operation thereof while abnormal conditions exist in the motor, each of said relays having a plurality of operating windings connected in different phases of the secondary circuit of the motor.

7. In a controller for alternating current motors, in combination, a plurality of electroresponsive accelerating switches, and a plurality of relays, each adapted to control the circuit of the operating winding of one of said switches to prevent operation thereof while abnormal conditions exist in the motor, each of said relays having a plurality of operating windings connected in different phases of the secondary circuit of the motor, and all of the windings of each relay being electrically connected.

8. In a controller for alternating current motors, in combination, an accelerating switch, and a relay for checking the operation of said switch upon the occurrence of an excessive flow of current through the motor, said relay having a plurality of operating windings, one of said windings being connected in each phase of the secondary circuit of the motor.

9. In a controller for alternating current motors, in combination, an accelerating switch, and a relay for checking the operation of said switch upon the occurrence of an excessive flow of current through the motor, said relay having a plurality of operating windings, one of said windings being connected in each phase of the secondary circuit of the motor, said switch, when actuated, being arranged to short-circuit all of the operating windings of said relay.

10. In a controller for alternating current motors, in combination, a plurality of electroresponsive accelerating switches, arranged to operate successively, a relay switch arranged in circuit with the operating winding of each accelerating switch, and a plurality of operating windings for each relay switch connected in different phases of the secondary circuit of the motor, said relay switches being arranged to respond upon an excessive flow of current through the motor to check the successive operation of the accelerating switches.

11. In a controller for alternating current motors, in combination, a plurality of electroresponsive accelerating switches, arranged to operate successively, a relay switch arranged in circuit with the operating windings of each accelerating switch, a plurality of operating windings for each relay switch connected in different phases of the secondary circuit of the motor, said relay switches being arranged to respond upon an excessive flow of current through the motor to check the successive operation of the accelerating switches, and circuit connections for causing each accelerating switch, when actuated, to short-circuit the windings of its corresponding relay switch, and to connect the windings of the relay switch of the next succeeding accelerating switch in circuit.

In witness whereof, I have hereunto subscribed my name in the presence of two witnesses.

ARTHUR SIMON.

Witnesses:
FRANK H. HUBBARD,
WALTER E. SARGENT.